US007091977B2

(12) United States Patent
Jeong et al.

(10) Patent No.: US 7,091,977 B2
(45) Date of Patent: Aug. 15, 2006

(54) ANIMATION METHOD OF DEFORMABLE OBJECTS USING AN ORIENTED MATERIAL POINT AND GENERALIZED SPRING MODEL

(75) Inventors: Il Kwon Jeong, Taejon (KR); In Ho Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 154 days.

(21) Appl. No.: 10/821,869

(22) Filed: Apr. 12, 2004

(65) Prior Publication Data
US 2005/0046629 A1   Mar. 3, 2005

(30) Foreign Application Priority Data
Sep. 3, 2003   (KR) ............... 10-2003-0061525

(51) Int. Cl.
*G06T 13/00* (2006.01)
*G06T 15/70* (2006.01)
(52) U.S. Cl. ....................... 345/473; 345/475
(58) Field of Classification Search .............. None
See application file for complete search history.

(56) References Cited

U.S. PATENT DOCUMENTS

| 5,777,619 | A   |   | 7/1998  | Brinsmead              |
|-----------|-----|---|---------|------------------------|
| 6,342,886 | B1  | * | 1/2002  | Pfister et al. ... 345/424 |
| 6,525,735 | B1  |   | 2/2003  | Maillot                |
| 6,532,014 | B1  |   | 3/2003  | Xu et al.              |
| 6,573,897 | B1  | * | 6/2003  | Desbrun et al. ... 345/473 |
| 2002/0180739 | A1 | * | 12/2002 | Reynolds et al. ... 345/474 |

FOREIGN PATENT DOCUMENTS

| JP | 4-302061 | 10/1992 |
|----|----------|---------|
| JP | 5-61961  | 3/1993  |

OTHER PUBLICATIONS

Desbrun et al., Interactive animation of structured deformable objects, 1999, Proceedings of the 1999 conference on Graphics interface '99, pp. 1-8.*
Baraff, et al.; "Large Steps in Cloth Simulation"; SIGGRAPH '98; CD-ROM version; pp. 1-12.

(Continued)

*Primary Examiner*—Ulka Chauhan
*Assistant Examiner*—Said Broome
(74) *Attorney, Agent, or Firm*—Mayer, Brown, Rowe and Maw LLP

(57) ABSTRACT

Disclosed is an animation method of deformable objects using an oriented material point and generalized spring model. The animation method comprises the following steps of: modeling a structure of a deformable object into oriented material points and generalized springs; initializing forces and torques acting on the material points, calculating the forces acting on the material points owing to collision of the material points and gravity, calculating the spring forces and torques acting on the material points, obtaining new positions and postures of the material points; updating positions, velocities, postures and angular velocities of the material points based upon physics, and displaying and storing updated results. The oriented material point and generalized spring model of the invention contains the principle of the conventional mass-spring model, but can animate deformable objects or express their structures in more intuitive manner over the conventional mass-spring model. Also, the material point and generalized spring model of the invention can express elongate deformable objects such as hair and wrinkled cloth, which cannot be expressed in the prior art, so as to animate features of various objects.

4 Claims, 4 Drawing Sheets

OTHER PUBLICATIONS

Szeliski, et al.; "Surface Modeling with Oriented Particle Systems"; SIGGRAPH '92 Chicago Jul. 26-31, 1992; Computer Graphics, 26, 2; Jul. 1992; pp. 185-194.

Choi, et al.; "Stable but Responsive Cloth"; Seoul National University.

Cordier, et al; "Real-time Animation of Dressed Virtual Humans"; EUROGRAPHICS 2002; vol. 21 (2002), No. 3.

* cited by examiner

ANIMATION METHOD OF DEFORMABLE OBJECTS USING AN ORIENTED MATERIAL POINT AND GENERALIZED SPRING MODEL

BACKGROUND OF THE INVENTION

1. Field of the Invention

The present invention relates to an animation method of deformable objects, in particular, by modeling a deformable object into oriented material points and generalized springs. More particularly, the present invention animates a deformable object by modeling the deformable object into a structure of material points connected with generalized springs, calculating force and torque applied to the material points by the springs and external force, and integrating the force and torque to obtain new positions and postures of the material points.

2. Description of the Related Art

Recently, three dimensional (3 D) animation is being more widely used owing to the performance enhancement and cost reduction of 3 D graphic accelerator cards in use for computers such as a work station and a Personal Computer (PC). As a result, real time calculation of physical simulation, which was impossible in the past owing to long calculation time, is enabled thereby creating a new field of physically based simulation in 3 D animation. In case of 3 D games, there is a trend that such physically based simulation is recently used together with conventional motion capture technique in order to impart smooth animation to the human body of a main character so that the main character interacts realistically and physically with virtual objects. In particular, an animation of deformable objects such as hair or clothes of a game character waving or fluttering in the wind breathes vividness into game contents.

Deformable object animation in contrast with fixed or rigid body animation refers literally to animation of objects which are not fixed in shape. Representative examples of deformable objects may include one dimensional objects such as hair, two dimensional objects such as cloth, clothes and flag, and three dimensional objects such as jelly and tube.

Current deformable object animation widely adopts a mass-spring model. For example, this technique models a deformable object into a group of material points connected by springs, calculates forces applied to the material points via the springs, and integrating the forces to obtain new positions to animate the deformable object. The springs adopted in this technique are positioned in a three dimensional space; nevertheless they perform one dimensional motions.

FIG. 1 schematically illustrates a mass-spring model of the prior art. Referring to FIG. 1, the mass-spring model of the prior art includes basically two material points 101 and 102 and a spring 103 for connecting the material points 101 and 102. The reference numeral 104 in FIG. 4 designates the length L of the spring 103. Expanding or contacting the spring 103 generates a force proportional to the length variation of the spring. When a spring is transformed, a force reacting on the spring is expressed mathematically as equation 1:

$$F = -k^* x \quad \text{Equation 1,}$$

wherein k is spring constant, and x is the length variation of the spring.

If the two material points 101 and 102 are connected with the spring, they are applied with equal but opposite forces owing to the law of action-reaction. According to Equation 1, it would be understood that the forces applied to the material points are proportional to the length variation of the spring but not related to the spatial posture of the spring.

Accordingly, when the conventional mass-spring model is utilized to constitute a one dimensional deformable object such as a mobile, the one dimensional deformable object is applied with external force such as gravity to collapse the shape of the one dimensional deformable object, without any force for restoring the original shape of thereof. For example, on the assumption that gravity is applied downward in a one dimensional deformable object such as a mobile, when the uppermost material point of the one dimensional deformable object is fixed, the remaining material points are aligned on a line in the direction of gravity so that the one dimensional deformable object loses its original shape. Forming a two dimensional deformable object such as an uneven cloth via the conventional mass-spring model also does not provide any restoring force to maintain the original uneven shape of the two dimensional deformable object, and thus external force collapses the shape of the two dimensional deformable object. Also, even though a three dimensional deformable object in the shape of a cube is formed based upon the conventional mass-spring model, this deformable object cannot maintain its cubic shape owing to a principle applied thereto that is similar to the above explanation.

Because there are problems in maintaining the original shape of a deformable object, the afore-described conventional deformable object animation using the mass-spring model has a drawback to further have a spring for maintaining the structure of the deformable object in addition to an intuitive structure for expressing the shape of the deformable object. That is, because a spring structure becomes more sophisticated in proportion to the complexity of a deformable object subject to mass-spring modeling, it is difficult for a user to establish the spring structure.

As a previous patent of the conventional deformable object animation, there is disclosed U.S. Pat. No. 6,532,014 (registered on Mar. 11, 2003) entitled "Cloth Animation Modeling." This previous patent decouples longitudinal nodes from latitudinal nodes and connects splines with springs to calculate forces between the nodes in order to execute cloth modeling. However, this previous patent has limited effects since it restricts the object of animation to cloth among deformable objects.

Another previous patent of the conventional deformable object animation discloses U.S. Pat. No. 5,777,619 (registered on Jul. 7, 1998) entitled "Method for Simulating Hair Using Particle Emissions."This previous patent is characterized in that the hair is simulated as a particle system in contemplation that the shape of a hair is similar to the trajectory of a particle emission. Although this previous patent is effective to the hair among deformable objects subject, there is a drawback it is not suitable to simulation of other deformable objects since particles are not connected together.

Also, there is a previous document about the conventional deformable object animation entitled "Large Steps in Cloth Simulation" (Proc. of SIGGRAPH 98, pp 43–54, 1998), proposed by D. Baraff and A. Witkin. The previous document presents mathematically a method for executing numerical integration more rapidly and effectively in cloth animation. This method is characterized by proposing an implicit integration technique having stability superior to conventional explicit integration techniques and solving calculation of the implicit integration technique via conversion into a linear system. However, since the previous method is mainly aimed to accelerate calculation speed rather than to improve mass-spring modeling, the subject of this method is different from that of the invention.

SUMMARY OF THE INVENTION

The present invention has been made to solve the foregoing problems of the conventional deformable object animation methods using a mass-spring model which further require structure-reinforcing springs.

It is therefore an object of the invention to provide an animation method of deformable objects using an oriented mass point and generalized spring model, in which generalized springs have restoring forces against bending and twisting, by which a user can intuitively and easily animate various forms of deformable objects with the generalized springs.

According to an aspect of the invention for realizing the foregoing object, there is provided an animation method of deformable objects using an oriented material point and generalized spring model, the method comprising the following steps of:

(a) modeling a structure of a deformable object into oriented material points and generalized springs;

(b) initializing forces and torques acting on the material points, calculating the forces acting on the material points based upon external forces such as collision of the material points and gravity, accumulatively calculating the forces and torques acting on the material points with respect to all of the springs, adding the calculated forces to the corresponding material points and executing numerical integration based upon calculation results in order to obtain new positions and postures of the material points;

(c) updating positions, velocities, postures and angular velocities of the material points based upon the calculation results in the step (b), and displaying updated results regarding the offset of the material points; and (d) inspecting termination conditions, and if the termination conditions are not satisfied, repeating the steps (b) to (d).

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will present a preferred embodiment of the invention with reference to the accompanying drawings.

Figure 5:
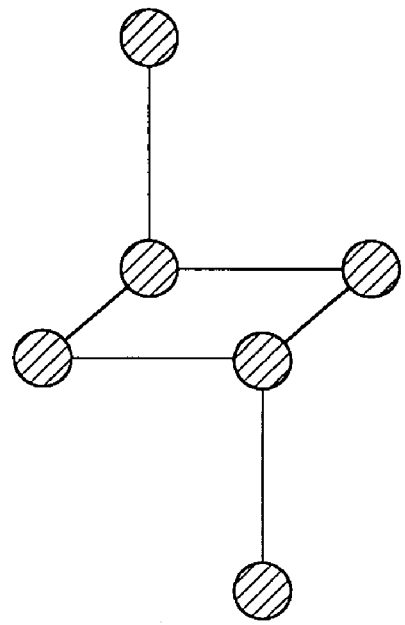
FIG. 5 illustrates a one dimensional object model according to the animation method of the invention.

FIG. 5 illustrates a one dimensional object model according to the animation method of the invention. When a conventional mass-spring model is used to form the one dimensional deformable object model as shown in FIG. 5, the one dimensional deformable object model collapses under the application of an external force such as gravity because it has no force for maintaining its present shape against the external force. Therefore, the conventional mass-spring model further needs a spring for maintaining its shape in addition to springs for expressing its shape. However, this requires a number of experiences or trials and errors.

Figure 1:
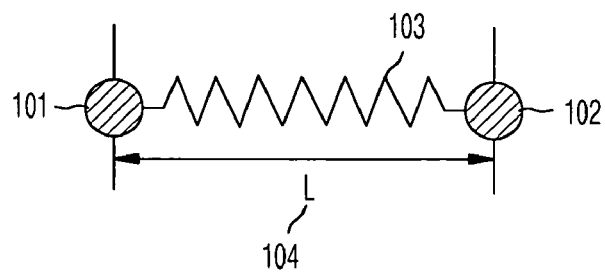
FIG. 1 schematically illustrates a mass-spring model of the prior art.
Figure 2:
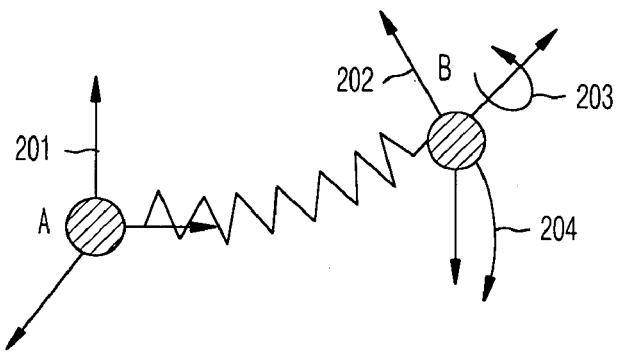
FIG. 2 schematically illustrates an oriented material point and generalized spring model based upon an animation method of deformable objects according to an embodiment of the invention.

FIG. 2 schematically illustrates an oriented material point and generalized spring model based upon an animation method of deformable objects according to an embodiment of the invention. Referring to FIG. 2, a material point A 201 and a material point B 202 have their own local coordinates. Herein, the term of an oriented material point means a material point having local coordinates. In an equilibrium situation, it is assumed that the two material points and the spring are equal to those in FIG. 1. As shown in FIG. 2, if there is a modification to the posture of the material point B 202, the generalized spring creates a restoring force against bending or bending-restoring force 204 and a restoring force against twisting or twist-restoring force 203 in addition to an expansion or contraction force (refer to FIG. 1). The bending- and twist-restoring forces are calculated using angles of rotation between the local coordinates of the respective material points. It can be understood that the restoring forces are appropriate, when associated with the behavior of a real spring. Although there is a deformation as shown in FIG. 2, the conventional mass-spring model shown in FIG. 1 has only the expansion or contraction force according to the distance between the two material points.

Figure 3:
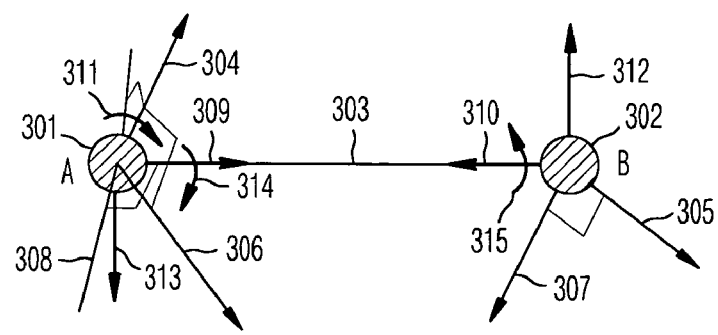
FIG. 3 schematically illustrates the oriented material point and generalized spring model shown in FIG. 2 to explain force and torque calculation.

FIG. 3 schematically illustrates the oriented material point and generalized spring model shown in FIG. 2 to explain force and torque calculation. Referring to FIG. 3, a material point A 301 and a material point B 302 are connected together via a generalized spring 303. Herein, the term of the generalized spring means that the spring creates bending- and twist-restoring forces calculated from postural differences of the material points in addition to the afore-described one dimensional expansion or contraction force. For the restoring forces, each material point has two reference vectors with respect to one spring connected to the material point. In FIG. 3, the reference numeral 304 designates a reference bending vector, i.e., a reference vector of the material point A 301 expressing its bending with respect to the generalized spring, the reference numeral 306 designates a reference twist vector, i.e., a reference vector of the material point A 301 expressing its twisting with respect to the generalized spring. Similarly, the reference numeral 305 designates a reference bending vector of the material point B 302, and the reference numeral 307 designates a reference twist vector of the material point B 302. The force acting via the generalized spring of the invention consists of three components: the expansion force owing to the unique property of the one dimensional spring, the bending-restoring force and the twist-restoring force. Because a negative expansion force means a contraction force as a result, hereinafter the expansion force will be described without distinction from the contraction force. The expansion force indicates a force proportional to the length variation of the spring as in the conventional one dimensional spring, and the bending-restoring force indicates a torque based upon the angle difference between a reference bending vector of a material point and a spring length vector. The twist-restoring force indicates a torque based upon the angle difference between the two reference twist vectors 306 and 307 of the two material points 301 and 302 when the reference twist vectors 306 and 307 are projected onto a plane normal to the spring length vector.

In FIG. 3, the reference numeral 309 designates an expansion force acting on the material point A 301, and the reference numeral 310 designates a reaction force with respect to the expansion force 309. The expansion force is expressed as F=−k*x, wherein k indicates spring constant. The reference numeral 308 designates the rotational axis of the material point A 301 used for expressing the bending-restoring force. The rotational axis 308 is a straight line that is normal to both the reference bending vector 304 of the material point A 301 and the expansion force 309 acting on the material point A 301 and passing through the center of the material point A 301. A restoring force is created based upon the angle difference between a reference vector and a spring length vector, in which a torque 311 acting on the material point A 301 is a function of the reference bending vector 304 of the material point A 301 and the spring length vector. The torque 311 acts to rotate the reference bending vector 304 in a direction same as that of the spring length vector, and its magnitude may be proportional to the angle between the vector 304 and the spring length vector. Thus, the torque 311 applies a force 312, which is normal to a plane defined by the rotational axis 308 and the spring length vector, to the material point B 302. The force 312 is inverse proportional to the distance between the material point A 301 and the material point B 302. The reference numeral 313 designates a reaction force against the force 312, in which the reaction force 313 acts on the material point A 301 to bring equilibrium of force.

The restoring torque 314 against twisting acting on the material point A 301 is determined by the reference twist vector 306 of the material point A 301, the reference twist vector 307 of the material point B 302 and the spring length vector. In more detail, the two reference twist vectors 306 and 307 are projected onto a plane normal to the spring length vector. Assuming the projected reference twist vectors of the material point A 301 and the material point B 302 as V1 and V2 respectively, the twist-restoring force acting on the material point A 301 is the torque 314 acting to align V1 with V2, and its rotational axis is the spring length vector. The material point B 302 is applied with a reaction torque 315 which has the magnitude same as that of the torque 314 but is oriented opposite.

Hereinafter explanation will be made about an example of calculating forces and torques acting on the oriented material points via the generalized spring. Where the material point A 301 and the material point B 302 have position vectors Pa and Pb, velocity vectors Va and Vb, reference bending vectors Dbend_a and Dbend_b, reference twist vectors Dtwist_a and Dtwist_b and angular velocity vectors Wa and Wb; spring constant is Kp; restoring torque constant against bending is Jb_p; restoring torque constant against twisting is Jt_p; and unstretched spring length is L. All reference vectors are assumed to have unit length. Pseudo codes of a function for calculating a force vector Fa and an angular acceleration vector Ta acting on the material point A and a force vector Fb and an angular acceleration vector Tb acting on the material point B are expressed as follows:

function [Fa, Ta, Fb, Tb]=spring(Pa, Va, Dbend_a, Dtwist_a, Wa, Pb, Vb, Dbend_b, Dtwist_b, Wb, Kp, Jb_p, Jt_p, L)

vec_ab=Pb−Pa; // vector from the material point A to the material point B or vector AB d=norm(vec_ab); // norm of vector AB or distance between the material points A and B vec_ab=normalize(vec_ab); // magnitude of vector AB is normalized to 1 vec_ba=−vec_ab; // vector BA theta=acos(Dbend_·vec_ab); // angle defined by Dbend_a and vector AB Ta=(Dbend_a×vec_ab)*Jb_p*theta; // bending-restoring torque acting on A Fb=normalize(Dbend_a−vec_ab*(Dbend_a·vec_ab)) *Kp*theta/d; // force acting on B owing to bending-restoring torque acting on A Fa=−Fb; // reaction force of above force having equal magnitude but opposite direction theta=acos(normalize(Dtwist_a−vec_ab* (Dtwist_a·vec_ab))·normalize(Dtwist_b−vec_ba* (Dtwist_b·vec_ba))); // angle defined by two projected reference twist vectors Ta=Ta+normalize((Dtwist_a−vec_ab* (Dtwist_a·vec_ab))×(Dtwist_b−vec_ba* (Dtwist_b·vec_ba)))*Jt_p*theta−damping(Wa); // twist-restoring torque acting on material point A and damping torque against rotation of material point A Tb=−Ta; // twist-restoring torque acting on material point B Fa=Fa+Kp*vec_ab*(d−L); // addition of expansion force acting on material point A Fb=Fb−Kp*vec_ab*(d−L); // addition of expansion force acting on material point A theta=acos(Dbend_b·vec_ba); // angle defined by Dbend_b and vector BA Tb=Tb+(Dbend_b×vec_ba)*Jb_p*theta−damping(Wb); // addition of bending-restoring torque and damping force acting on B Fa=Fa+normalize(Dbend_b−vec_ba*(Dbend_b·vec_ba)) *Kp*theta/d−damping(Va, Vb); // addition of force acting on material point A owing to bending-restoring torque and damping force Fb=Fb−normalize(Dbend_b−vec_ba*(Dbend_b·vec_ba)) *Kp*theta/d−damping(Va, Vb); // addition of reaction force of above bending-restoring torque and damping force of material point B Herein angular velocity vector is a concept in contrast with linear velocity. For example, an angular velocity vector W indicates the rotation at a rotation rate |W| around a rotational axis W. Angular acceleration vector indicates a value obtained by differentiating angular velocity vector with respect to time. Damping force is generally applied in order to solve numerical instability which may occur in integration for the purpose of position calculation. Damping force is proportional to the magnitude of the relative velocity of an object, and directed opposite thereto. Those portions expressed as damping ( ) in the above pseudo codes indicate damping force.

It will be understood by those skilled in the art that more physically proper expressions can be made based upon the above example of calculating forces and torques and structural features of a deformable object can be variously established by varying constants according to material properties.

Figure 4:
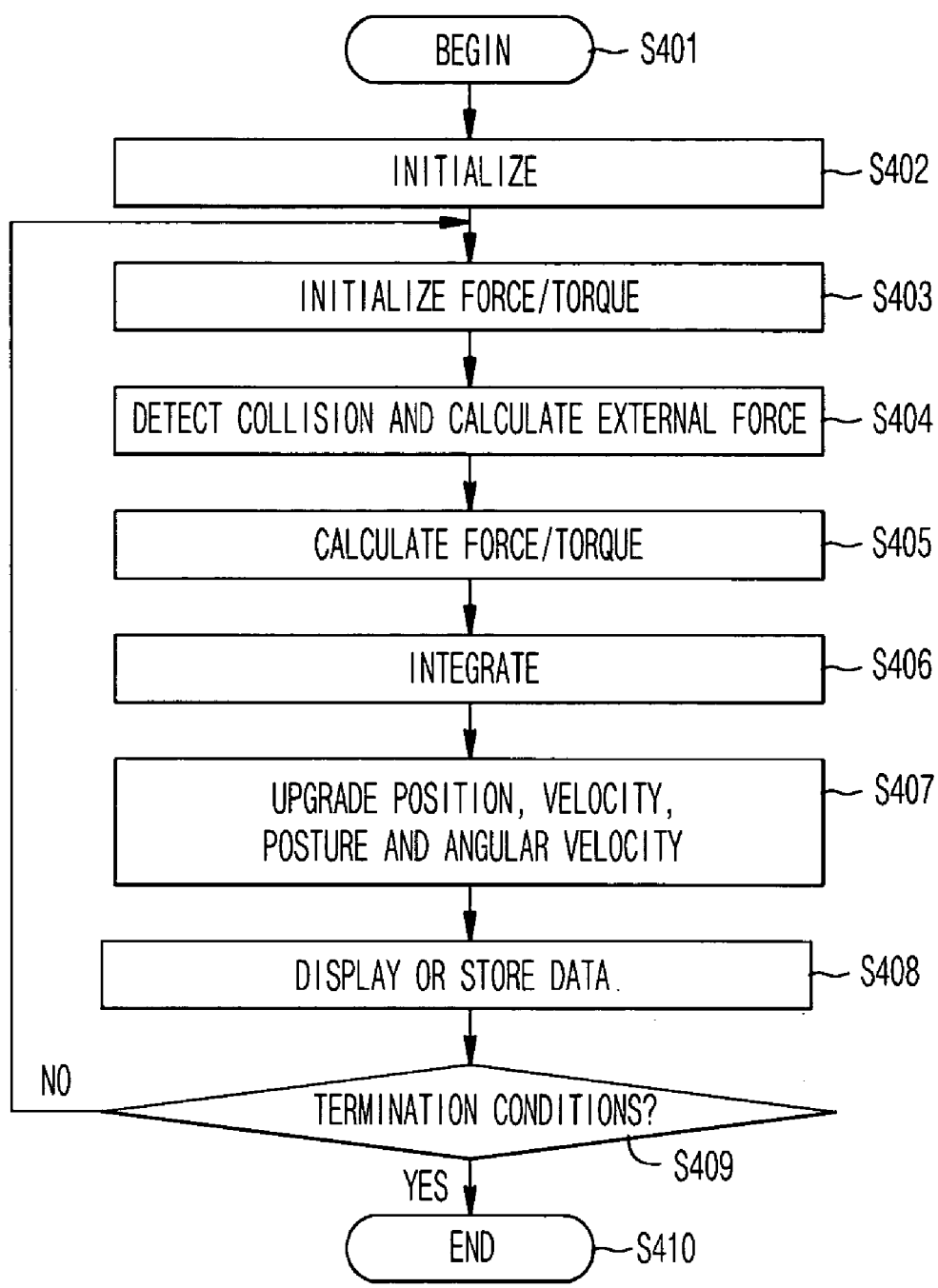
FIG. 4 is a flowchart of the animation method of deformable objects according to the embodiment of the invention.

FIG. 4 is a flowchart of the animation method of deformable objects according to the embodiment of the invention.

As the operation begins (S401), an initialization step S402 is executed to model a deformable object into oriented material points and generalized springs and initialize various spring constants.

Then, a force/torque initializations step S403 is executed, in which previous calculation results of forces and torques are deleted in order to calculate expansion and restoring forces owing to the generalized springs. In a collision detection and external force calculation step S404, forces acting on the material points according to collision of the material points and external forces such as gravity are calculated. Then, a force/torque calculation step S405 is executed to accumulatively calculate forces and torques acting on the material points with respect to all of the springs in the same fashion as the above example of calculating forces and torques. The forces and torques calculated in S405 are added to the respective material points. An integration step S406 processes numerical integration based upon calculation results of S405 to calculate new positions and postures of the material points. Numerical integration may be executed using any of methods well-known in the art, and can be carried out variously by those skilled in the art without no difficulty. As a simple example, a Euler's method can be applied. A position, velocity, posture and angular velocity upgrade step S407 substitutes previous values by resultant values obtained in S406.

A display or data storage step S408 displays the deformable object on a screen based upon the positions of the material points obtained in S407 or store data related with the positions for future use. Next, S409 is executed to inspect whether termination conditions of deformable object animation are satisfied. If the termination conditions are not satisfied in S409, execution returns to S403 to repeat following steps S404 to S409. If the termination conditions are satisfied, the animation method according to the embodiment of the invention ends (S410).

Figure 6:
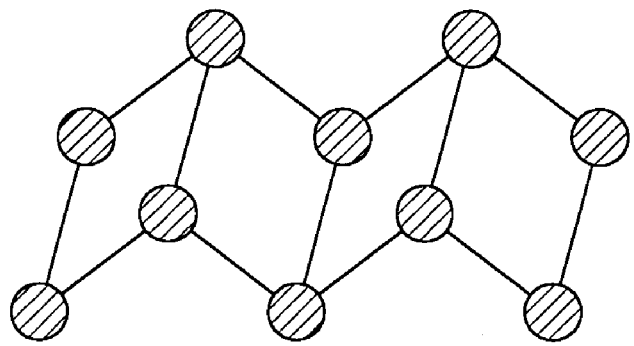
FIG. 6 illustrates a two dimensional object model according to the animation method of the invention.
Figure 7:
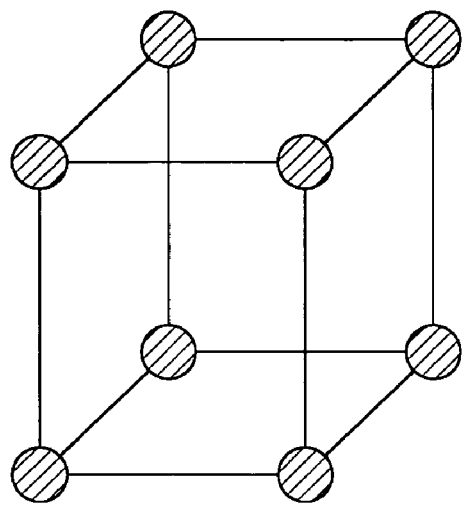
FIG. 7 illustrates a three dimensional object model according to the animation method of the invention.

FIG. 5 illustrates a one dimensional object model according to the animation method of the invention, FIG. 6 illustrates a two dimensional object model according to the animation method of the invention, and FIG. 7 illustrates a three dimensional object model according to the animation method of the invention.

As described above, if those models shown in FIGS. 5 to 7 are formed according to the conventional mass-spring model, all of the models are structurally unstable, and their shapes may collapse under any external force such as gravity. In contrast with the conventional mass-spring model, if the models are formed of the oriented material points and the generalized springs of the invention, all of the above three models form structurally stable deformable objects so that animation can be smoothly performed.

Figure 8:
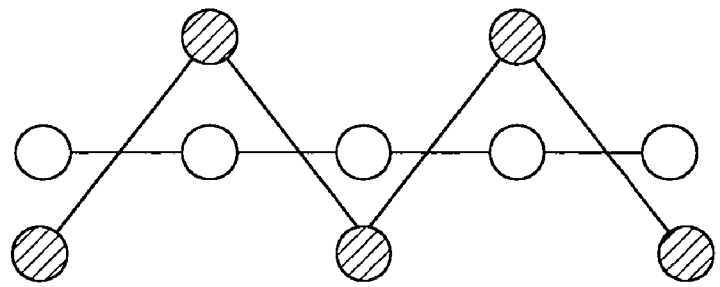
FIG. 8 illustrates the offset of material points according to the animation method of the invention.

FIG. 8 illustrates the offset of material points according to the animation method of the invention. Referring to FIG. 8, white material points indicate real material points, in which the respective material points have offset upward or downward, and black virtual material points indicate offset positions. By offsetting the material points and displaying the material points as if they exist in the offset positions, a deformable object such as wrinkled cloth can be partly simulated even in the conventional mass-spring model. This method of course can be applied to the oriented material point and generalized spring model of the invention. The offset may include position transformation as well as rotational transformation, and applying the offset enables complicated deformable objects to be animated with a relatively simple mass-spring model.

As set forth above, instead of the conventional methods which rarely ensure structural stability, have sophisticated shapes owing to additional structure-reinforcing springs, and require expertise, the animation method of deformable objects using a material point and spring model of the present invention use the oriented material points and the generalized springs to realize intuitive modeling of deformable objects. Further, the animation method of the invention can generate various restoring forces compared to the conventional methods to advantageously animate deformable objects of various characteristics. Thus, the animation method of the invention is expected to be widely utilized in 3 D animations and special effects from now on according to the enhancement of computing performance.

The animation method of deformable objects using an oriented material point and generalized spring model according to the preferred embodiment of the invention has been described for illustrative purposes only. Rather, it is to be understood that the present invention is not limited to the above embodiments but those skilled in the art can make various modifications and changes without departing from the scope of the invention defined by the appended claims.

What is claimed is:

1. An animation method of deformable objects using an oriented material point and generalized spring model, the method comprising the following steps of: (a) modeling a structure of a deformable object into oriented material points and generalized springs; (b) initializing forces and torques acting on the material points, calculating the forces acting on the material points based upon external forces such as collision of the material points and gravity, accumulatively calculating the forces and torques acting on the material points with respect to all of the springs, adding the calculated forces and torques to the corresponding material points and executing numerical integration based upon calculation results in order to obtain new positions and postures of the material points; (c) updating positions, velocities, postures and angular velocities of the material points based upon the calculation results in the step (b), and displaying updated results regarding the offset of the material points; and (d) inspecting termination conditions, and if the termination conditions are not satisfied, repeating the steps (b) to (d), wherein the oriented material point and generalized spring model has restoring forces against expansion, bending and twist of the springs, sets reference bending vectors and reference twist vectors of the material points with respect to the springs, and forms bending- and twist-restoring torques determined by length vectors of the springs and the reference vectors of the material points, and forms angular accelerations of the material points based upon the bending- and twist-restoring torques.

2. The animation method of deformable objects according to claim 1, wherein the step (c) applies offsets including rotational transformation and position transformation to the respective material points to output the material points in various forms as if they exist in offset positions.

3. The animation method of deformable objects according to claim 1, wherein the deformable objects are at least one of a group including one dimensional objects such as hair, two dimensional objects such as cloth, clothes and a flag, and three dimensional objects such as jelly and a tube.

4. The animation method of deformable objects according to claim 1, wherein the step (c) comprises: storing data about positions of the material points obtained in the step (b).

* * * * *